US012686983B2

(12) United States Patent
Ryoo et al.

(10) Patent No.: US 12,686,983 B2
(45) Date of Patent: Jul. 21, 2026

(54) STABBING SYSTEM FOR INSTALLING OFFSHORE JACKET STRUCTURE AND INSTALLATION METHOD OF OFFSHORE JACKET STRUCTURE USING THE SAME

(71) Applicant: K-BETS, Mokpo-si (KR)

(72) Inventors: Jae-yong Ryoo, Uijeongbu-si (KR);
Seung-hoon Chang, Seoul (KR)

(73) Assignee: K-BETS, Mokpo-si (KR)

( * ) Notice: Subject to any disclaimer, the term of this patent is extended or adjusted under 35 U.S.C. 154(b) by 550 days.

(21) Appl. No.: 18/009,752

(22) PCT Filed: Dec. 1, 2021

(86) PCT No.: PCT/KR2021/017955
§ 371 (c)(1),
(2) Date: Dec. 12, 2022

(87) PCT Pub. No.: WO2023/027256
PCT Pub. Date: Mar. 2, 2023

(65) Prior Publication Data
US 2023/0313481 A1     Oct. 5, 2023

(30) Foreign Application Priority Data
Aug. 23, 2021     (KR) ........................ 10-2021-0110984

(51) Int. Cl.
*E02D 27/42*          (2006.01)
*E02B 17/02*          (2006.01)
(Continued)

(52) U.S. Cl.
CPC .............. *E02B 17/02* (2013.01); *E02D 27/52*
(2013.01); *F03D 13/25* (2016.05)

(58) Field of Classification Search
CPC ....... E02D 27/42; E02D 27/425; E02D 27/52;
E02D 27/525; E02B 17/02; F03D 13/25
See application file for complete search history.

(56) References Cited

U.S. PATENT DOCUMENTS

2015/0368871 A1*  12/2015  Seidel ................... E02D 27/425
405/222
2017/0058474 A1*   3/2017  Haigh ....................... E02D 7/20

FOREIGN PATENT DOCUMENTS

CN          110886328      *    3/2020
JP          2003-049439 A       2/2003
(Continued)

*Primary Examiner* — Sean D Andrish
(74) *Attorney, Agent, or Firm* — NKL LAW; Jae Youn Kim

(57) ABSTRACT

The present disclosure relates to a stabbing system for installing an offshore jacket structure and an installation method for installing an offshore jacket structure using the same. Particularly, the stabbing system fixes, to a seabed-pile, a jacket leg of a jacket structure to be inserted into the seabed-pile that was pre-inserted into the seabed and includes: a stabbing member that is installed on an external surface of the jacket leg and supported by an upper end surface of the seabed-pile when the jacket leg has been inserted into the seabed-pile; a vertical gripper that is installed in plural number in the stabbing member and operated toward an upper end surface of the seabed-pile to adjust a horizontality degree of the jacket leg; a horizontal gripper that is installed in plural number in the outer periphery of the stabbing member and operated toward an external surface of the seabed-pile to fix the jacket leg to the seabed-pile; and a grouting unit that introduces grout into a space between the jacket leg and the seabed-pile, in a state that the jacket leg has been fixed inside the seabed-pile.

3 Claims, 9 Drawing Sheets

51

(51) Int. Cl.
 E02D 27/52       (2006.01)
 F03D 13/25       (2016.01)

(56)            References Cited

FOREIGN PATENT DOCUMENTS

| KR | 10-1629481 B1 | 6/2016 |
| KR | 10-1629611 B1 | 6/2016 |
| KR | 10-2019-0001451 A | 1/2019 |
| KR | 10-1992651 B1 | 6/2019 |
| WO | WO 2019/112421 * | 6/2019 |

* cited by examiner

STABBING SYSTEM FOR INSTALLING OFFSHORE JACKET STRUCTURE AND INSTALLATION METHOD OF OFFSHORE JACKET STRUCTURE USING THE SAME

BACKGROUND

Technical Field

The present disclosure relates to a stabbing system for installing an offshore jacket structure and an installation method of an offshore jacket structure using the same.

Related Art

When an offshore structure such as an offshore wind power device, an offshore drilling rig or etc. is installed in the middle of the sea, corrosion or pollution may happen thereto. Accordingly, a support structure is installed on the stratum of seabed to support the lower part of the support structure, a platform is provided on the support structure exposed to the surface of the sea, and then an offshore structure is installed on the platform.

The support structure is, for example, a jacket structure. The jacket structure includes a plurality of hollow-bodied legs and a base plate formed on the bottom part of the legs.

The base plate is in contact with the seabed, and the upper part of the legs is exposed to the surface of the sea, so as to form the platform. Further, mutually adjacent legs are interconnected by a connection bar.

FIG. 1 to FIG. 3 show cross-sectional views according to an existing method for building an offshore jacket structure. The existing method for building an offshore jacket structure includes steps of: positioning a jacket leg, that is, a substructure of the jacket structure on the seabed, inserting a jacket pile (pin pile 2) into the jacket leg 1 so as to penetrate the seabed, grouting between the pin pile 2 and the jacket leg 1 for fixation, and filling infilled concrete inside the pile.

It takes 48 days to install one offshore structure according to the existing method, and it may take more time by variables such as weather conditions during the installation thereof.

That is, this may be a factor causing increases in construction expenses of the base structure of the offshore wind power device. For that reason, the study for a stabbing system has been conducted, judging that the offshore support structure according to an installation method of the foundation substructure of an offshore wind power complex is inefficient.

SUMMARY

Technical Problem

Therefore, the present disclosure is contrived to solve conventional problems as described above. According to the embodiment of the present disclosure, aimed is to provide a stabbing system for installing an offshore jacket structure and an installation method of an offshore jacket structure using the same, wherein a seabed-pile is inserted into the seabed through a pile driving process rather than by positioning a jacket structure on the seabed, followed by inserting a leg of the jacket system where a stabbing system has been installed, and fixing for 24 hours by operating a gripper inside the stabbing system until the grout between the leg and the pile is completely hardened. Whereby it is possible to shorten construction time from 48 days per one offshore structure to about 36 days, saving construction time about 25%. Further, the shortened construction time of the base structure of the offshore wind power device results in reduction of the expenses and duration of construction and downsizing the device of use, whereby saving installation cost of and contributing supply activation of offshore wind power. Further, a stabbing member where a vertical gripper and an upper horizontal gripper have been installed is detached after construction, allowing being recycled. In a case of the horizontal gripper to be installed in the stabbing system, according to the shape and weight of the structure and the condition of seabed ground, both of the upper horizontal gripper and lower horizontal gripper may be installed at the same time, or the lower horizontal gripper may be not installed. The exclusion of the installation of the lower horizontal gripper from the horizontal gripper may result in reduction of construction expenses and production costs in terms of design and construction.

Technical Solution

The first aim of the present disclosure may be achieved by a stabbing system for installing an offshore jacket structure, as a stabbing system for fixing, to a seabed-pile, a jacket leg of an offshore jacket structure to be inserted into the seabed-pile that was pre-inserted into the seabed, including: a stabbing member that is installed on an external surface of the jacket leg and supported by an upper end surface of the seabed-pile when the jacket leg has been inserted into the seabed-pile; a vertical gripper that is installed in plural number in the stabbing member and operated toward the upper end surface of the seabed-pile to adjust a horizontality degree of the jacket leg; a horizontal gripper that is installed in plural number in the outer periphery of the stabbing member and operated toward an external surface of the seabed-pile to fix the jacket leg to the seabed-pile; and a grouting unit that introduces grout into a space between the jacket leg and the seabed-pile, in a state that the jacket leg has been fixed inside the seabed-pile.

The stabbing member includes a horizontal support plate that is formed in a form of ring plate on the external surface of the jacket leg and seated on the upper end surface of the seabed-pile; and a vertical support plate that has a tubular form, is bent in the outer periphery of the horizontal support and connected to a lower part thereof. The vertical gripper is configured in plural number, spacing apart from each other at a certain interval in a circumference direction on an upper surface of the horizontal support plate, and a piston is operated toward the upper end surface of the seabed-pile by a hydraulic cylinder, adjusting a horizontality degree of the seabed-pile. The horizontal gripper includes an upper horizontal gripper that is configured in plural number, spacing apart from each other at a certain interval in a circumference direction on an external surface of the vertical support plate and a piston is operated toward the external surface of the seabed-pile by a hydraulic cylinder, fixing the jacket leg to the seabed-pile; and a lower horizontal gripper that is configured in plural number, spacing apart from each other at a certain interval in a circumference direction on an inner end surface of the jacket leg and a piston is operated toward an inner surface of the seabed-pile by a hydraulic cylinder, fixing the jacket leg to the seabed-pile.

The grouting unit is installed inside the jacket leg, and a lower end thereof passes through and is connected to a lower end of the jacket leg, forming a grout pipe through which grout is introduced into a space between the jacket leg and the seabed-pile in a state that the jacket leg has been fixed inside the seabed-pile. The grouting unit further includes a grout seal provided between a lower end surface of the jacket leg and the seabed-pile, and a vertical gripper ring provided between the upper support plate and the vertical gripper.

The second aim of the present disclosure may be achieved by an installation method of an offshore jacket structure using a stabbing system including steps of: inserting a plurality of seabed-piles into the seabed; putting each jacket leg of an offshore jacket structure inside the seabed; seating, on an upper end of the seabed pile, a stabbing member of the stabbing system, and adjusting a horizontality degree of the jacket leg by operating a vertical gripper; fixing the jacket leg to the seabed-pile by operating an upper horizontal gripper of and a lower horizontal gripper of the stabbing system; and introducing grout into a space between the jacket leg and the seabed-pile through a grouting unit, in a state that the jacket leg has been fixed inside the seabed-pile.

The stabbing system includes a tilt sensor that measures a tilt of the jacket leg and a control portion that controls operations of the vertical gripper, the upper horizontal gripper and the lower horizontal gripper, based on a value measured from the tilt sensor. The control portion controls the vertical gripper based on a value measured from the tilt sensor to adjust a horizontality degree of the jacket leg, and controls operations of the upper horizontal gripper and the lower horizontal gripper based on a weight of the jacket leg while maintaining horizontality. After installing the offshore jacket structure, the stabbing member where at least one of the vertical gripper and the upper horizontal gripper, or the both thereof have been installed is detached, being recycled.

Advantageous Effects

A stabbing system for installing an offshore jacket structure and an installation method of an offshore jacket structure using the same according to the embodiment of the present disclosure have advantageous effects as follows. A seabed-pile is inserted into the seabed through a pile driving process rather than by positioning a jacket structure on the seabed, followed by inserting a leg of the jacket system where a stabbing system has been installed, and fixing for 24 hours by operating a gripper inside the stabbing system until the grout between the leg and the pile is completely hardened. Whereby it is possible to shorten construction time from 48 days per one offshore structure to about 36 days, saving construction time about 25%. Further, the shortened construction time of the base structure of the offshore wind power device results in reduction of the expenses and duration of construction and downsizing the device of use, whereby saving installation cost of and contributing supply activation of offshore wind power. Further, a stabbing member where a vertical gripper and an upper horizontal gripper have been installed is detached after construction, allowing being recycled. In a case of the horizontal gripper to be installed in the stabbing system, according to the shape and weight of the structure and the condition of seabed ground, both upper and lower horizontal grippers may be installed at the same time, or the lower horizontal gripper may be not installed. The exclusion of the installation of the lower horizontal gripper from the horizontal gripper may result in reduction of construction expenses and production costs in terms of design and construction.

FIGURE REFERENCE NUMBERS

Figure 1:
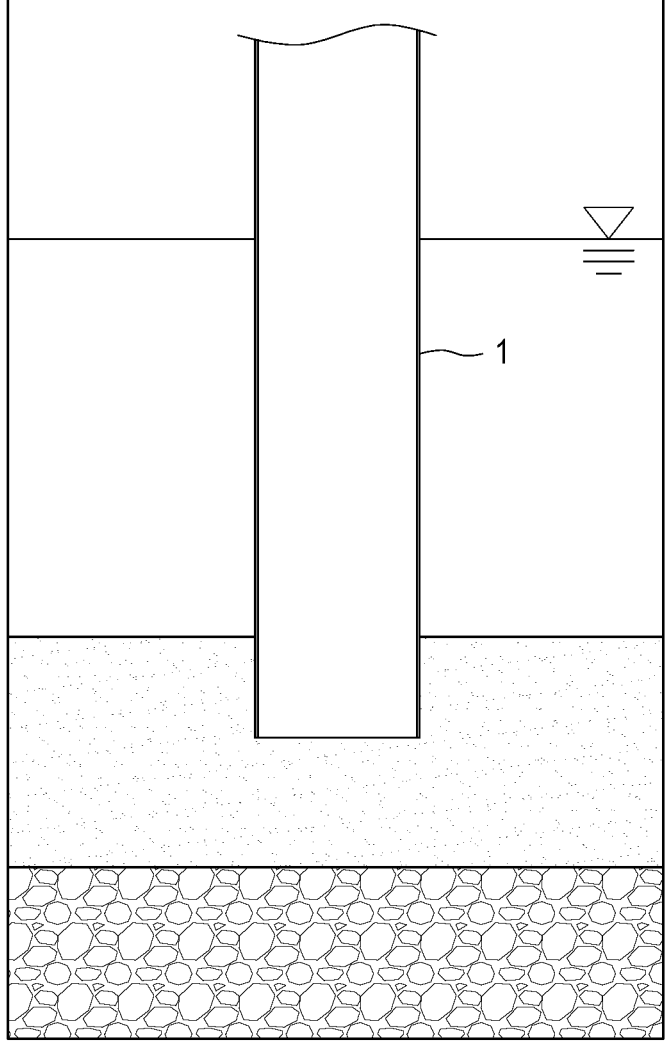
FIG. 1 to FIG. 3 are cross-sectional views showing existing construction methods of an offshore jacket structure.
Figure 2:
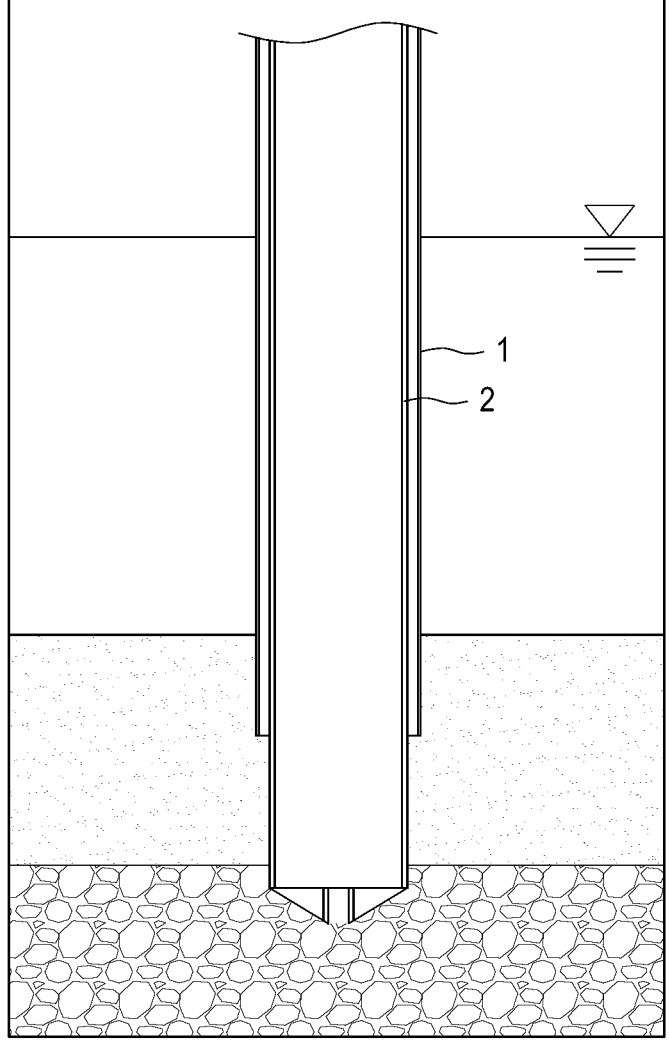
Figure 3:
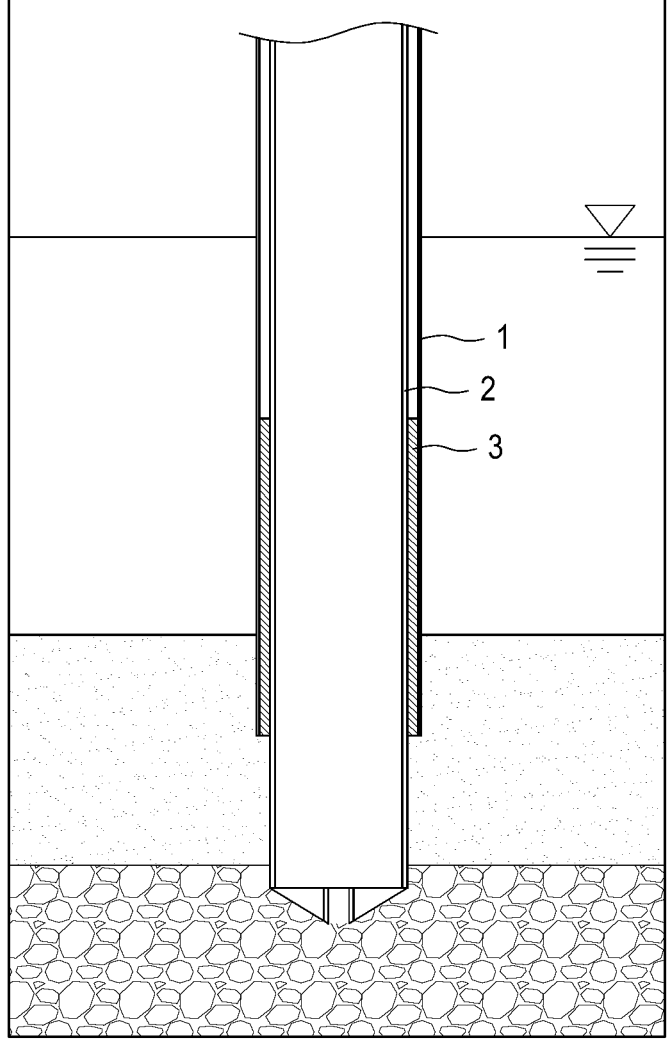

1: jacket leg 2: pin pile 3: grout 10: seabed-pile
20: stabbing member 21: horizontal support plate 22: vertical support plate
23: vertical gripper ring 30: vertical gripper 40: horizontal gripper 41: upper horizontal gripper 42: lower horizontal gripper
50: grout pipe 51: grout seal

DETAILED DESCRIPTION

Best Mode

Hereinafter, described are the configuration and function of a stabbing system for installing an offshore jacket structure and an installation method of an offshore jacket structure using the same, according to the embodiment of the present disclosure.

Figure 4:
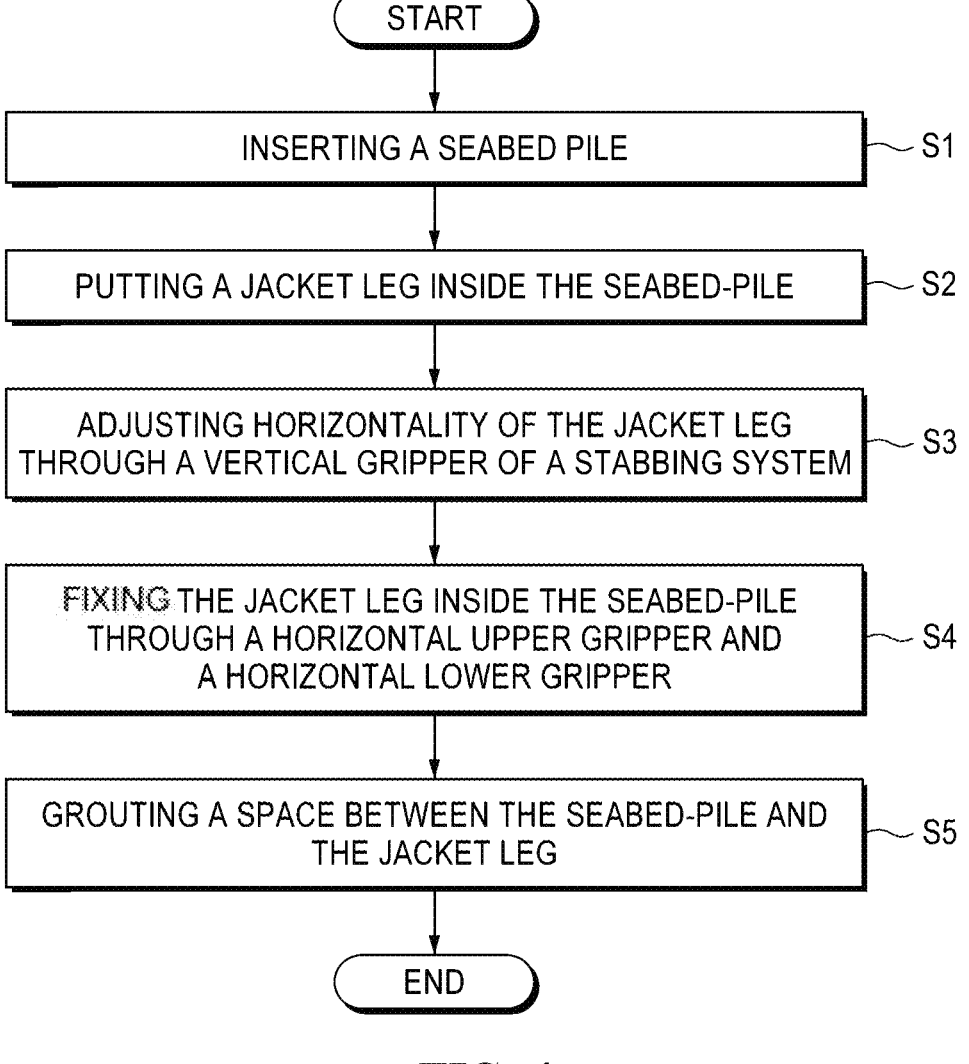
FIG. 4 is a flowchart showing an installation method of an offshore jacket structure using a stabbing system according to the embodiment of the present disclosure.

FIG. 4 is a flowchart showing an installation method of an offshore jacket structure using a stabbing system according to the embodiment of the present disclosure.

Figure 5:
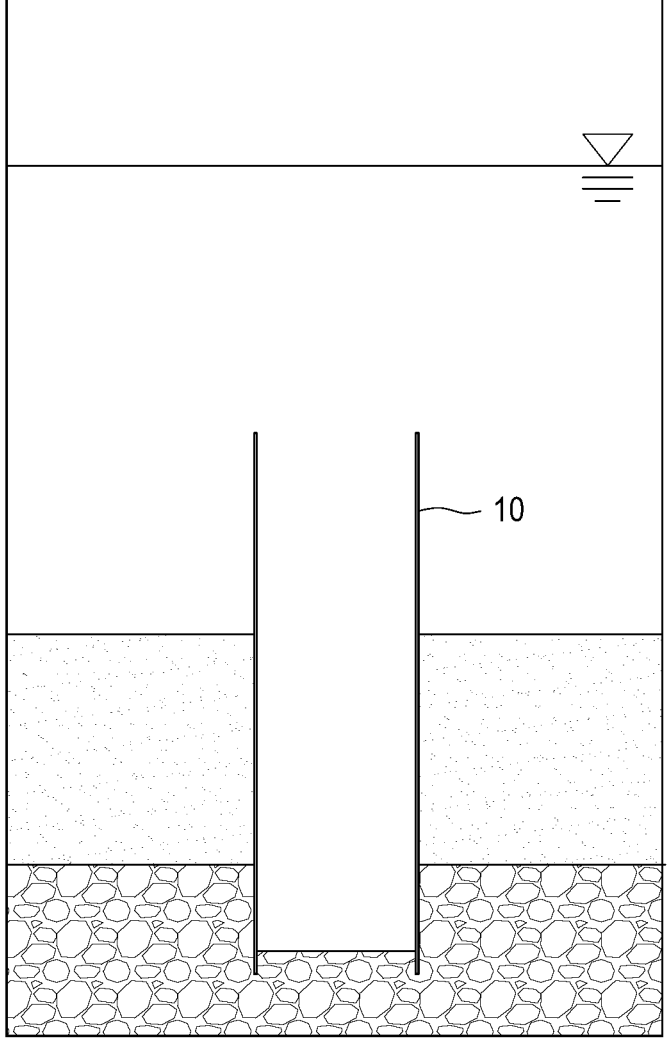
FIG. 5 is a cross-sectional view showing a state that a seabed-pile has been inserted according to the embodiment of the present disclosure.
Figure 6:
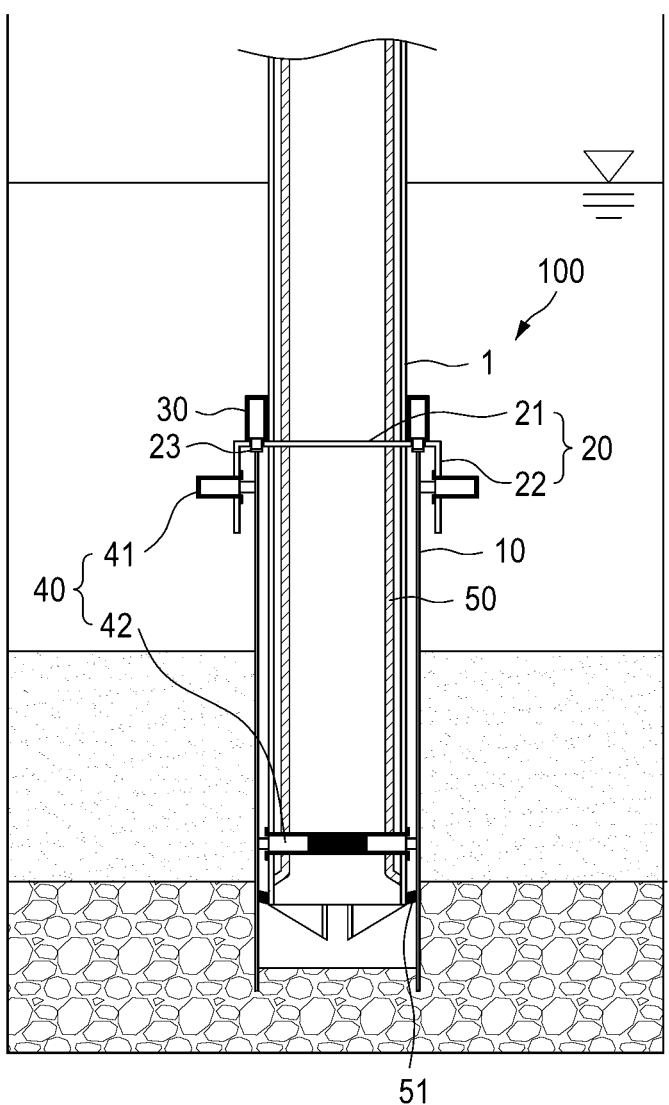
FIG. 6 is a cross-sectional view showing a state that a jacket leg of an offshore jacket structure having a stabbing system has been inserted into and fixed inside of a seabed-pile according to the embodiment of the present disclosure.

FIG. 5 is a cross-sectional view showing a state that a seabed-pile has been inserted according to the embodiment of the present disclosure. Further, FIG. 6 is a cross-sectional view showing a state that a jacket leg of an offshore jacket structure having a stabbing system has been inserted into and fixed inside a seabed-pile according to the embodiment of the present disclosure.

A pile gripper of a stabbing system 100 refers to an instrument for the underwater work for installing an offshore jacket structure. In applying the stabbing system 100, conditions for securing safety as same as the existing method are follows: grout should be introduced between a seabed-pile 10 and a jacket leg 1 in a state that the jacket leg 1 is completely fixed with the seabed-pile 10, allowing a spacing distance within 1 mm for 24 hours during which time grout 3 is being hardened.

Further, a tilt of a jacket structure should be designed not exceeding 0.25 degrees.

Description of Embodiments

According to an installation method of an offshore jacket structure using a stabbing system 100 in accordance with the embodiment of the present disclosure, firstly, a plurality of seabed-piles 10 is inserted into the seabed S1. Then, each jacket leg 1 of the offshore jacket structure is put inside the seabed-pile 10 S2.

Figure 7:
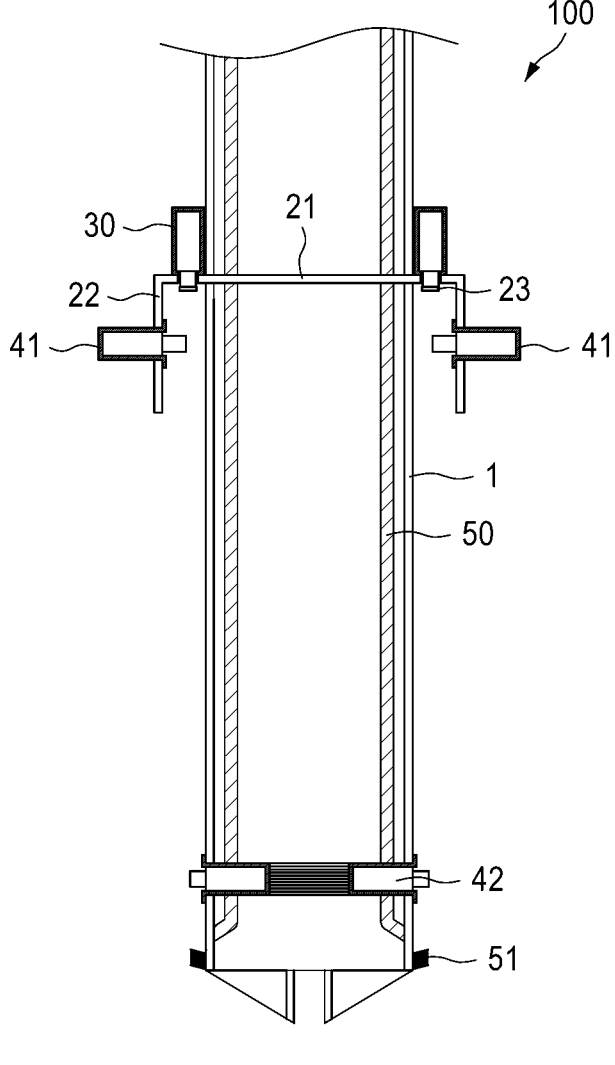
FIG. 7 is a cross-sectional view of a jacket leg of an offshore jacket structure having a stabbing system according to the embodiment of the present disclosure.
Figure 8:
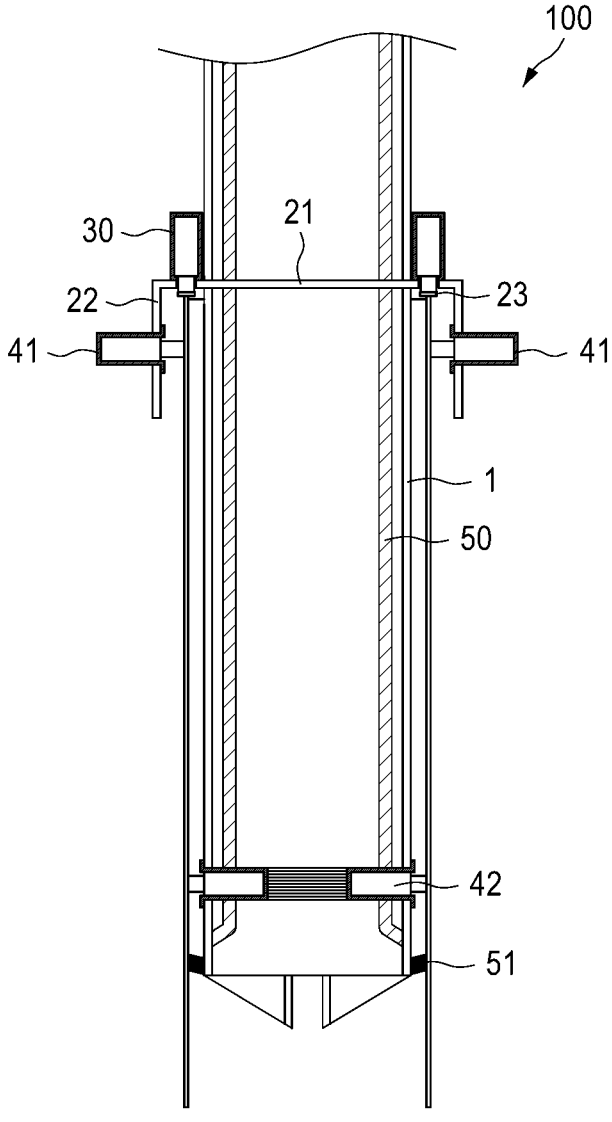
FIG. 8 is a partial cross-sectional view showing a state that a jacket leg of an offshore jacket structure having a stabbing system is inserted inside a seabed-pile according to the present disclosure.

FIG. 7 is a cross-sectional view of a jacket leg of an offshore jacket structure having a stabbing system according to the embodiment of the present disclosure. Further, FIG. 8 is a partial cross-sectional view showing a state that a jacket leg of an offshore jacket structure having a stabbing system is inserted inside a seabed-pile according to the present disclosure.

The stabbing system 100 for installing the offshore jacket structure in accordance with the present disclosure is to fix, to the seabed-pile 10, the jacket leg 1 of the offshore jacket structure to be inserted into the seabed-pile 10 that was pre-inserted into the seabed. This is configured to include a stabbing member 20, a vertical gripper 30, a horizontal gripper 40 and a grouting unit, etc.

The stabbing member 20 is configured to be installed on an external surface of the jacket leg 1 and supported by an upper end surface of the seabed-pile 10 when the jacket leg 1 has been inserted into the seabed-pile 10. This the stabbing member 20 is configured to include a horizontal support plate 21 that is formed in a form of ring plate on the external surface of the jacket leg 1 and seated on the upper end surface of the seabed-pile 10; and a vertical support plate 22 that has a tubular form, is bent in the outer periphery of the horizontal support plate 21 and connected to a lower part thereof.

Further, the vertical gripper 30 is configured to be installed in plural number in the stabbing member 20 and operated toward the upper end surface of the seabed-pile 10 to adjust a horizontality degree of the jacket leg 1. That is, the vertical gripper 30 is configured in plural number, spacing apart from each other at a certain interval in a circumference direction on an upper surface of the horizontal support plate 21, and a piston is operated toward the upper end surface of the seabed-pile 10 by a hydraulic cylinder, adjusting a horizontality degree of the seabed-pile 1.

The horizontal gripper 40 is configured to be installed in plural number in the outer periphery of the stabbing member 20 and operated toward an external surface of the seabed-pile 10 to fix the jacket leg 1 to the seabed-pile 10.

The horizontal gripper 40 includes a plurality of upper horizontal grippers 41 and a plurality of lower horizontal grippers 42. The upper horizontal grippers 41 is configured in plural number, spacing apart from each other at a certain interval in a circumference direction on an external surface of the vertical support plate 22 and a piston is operated toward the external surface of the seabed-pile 10 by a hydraulic cylinder, fixing the jacket leg 1 to the seabed-pile 10. Further, the lower horizontal gripper 42 is configured in plural number, spacing apart from each other at a certain interval in a circumference direction on an inner end surface of the jacket leg 1 and a piston is operated toward an inner surface of the seabed-pile 10 by a hydraulic cylinder, fixing the jacket 30 leg 1 to the seabed-pile 10.

In a particular embodiment, the number of the vertical grippers 30 per the jacket leg 1 of the jacket structure is four (4), the number of the upper horizontal grippers 41 is eight to twelve (8 to 12) and the number of the lower horizontal grippers 42 is four (4).

Further, a sharkey is installed inside the seabed-pile 10 for the grouting method. Thus, the upper horizontal gripper 41 is position outside the seabed-pile 10, preventing, in advance, interference in the sharkey, which might happen during installation of the jacket structure. For this, a distance from the lower horizontal gripper 42 is designed to be a spacing distance of about 7 m.

The horizontal gripper 40 is configured with the upper horizontal gripper 41 that is operated toward the external surface of the seabed-pile 10 and the lower horizontal gripper 42 that is operated toward the inner surface of the seabed-pile 10. In a case of the horizontal gripper 40 to be installed in the stabbing system, according to the shape and weight of the structure and the condition of seabed ground, both of the upper horizontal gripper 41 and the lower horizontal gripper 40 may be installed at the same time, or the lower horizontal gripper may be not installed. In the embodiment of the present disclosure, when excluding the installation of the lower horizontal gripper from the horizontal gripper, it is advantageous to possibly reduce construction expenses and production costs in terms of design and construction.

After inserting the jacket leg 1 into the seabed-pile 10, the stabbing member 20 of the stabbing system 100 is seated on an upper end of the seabed pile 10, and a horizontality degree of the jacket leg 1 is adjusted by operating the vertical gripper 30 S3. Then, the upper horizontal gripper 41 and lower horizontal gripper 42 of the stabbing system 100 are operated to fix the jacket leg 1 to the seabed-pile 10 S4. Then, the grout 3 is introduced into a space between the jacket leg 1 and the seabed-pile 10 through the grouting unit, in a state that the jacket leg 1 has been fixed inside the seabed-pile 10 S5.

Figure 9:
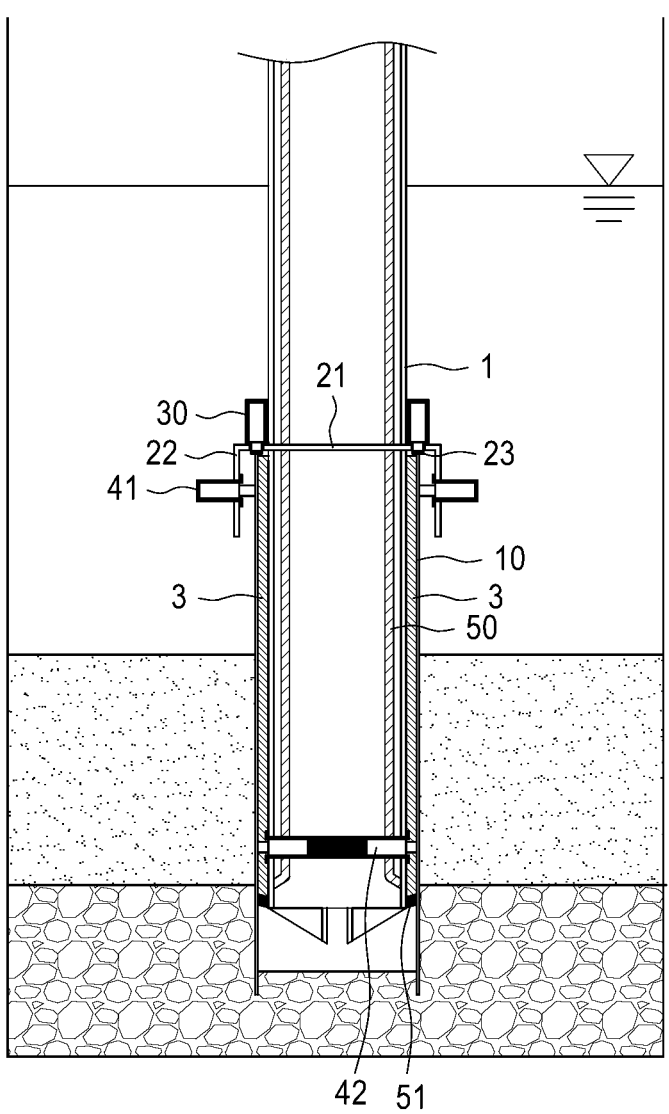
FIG. 9 is a cross-sectional view showing a state that grout has been filled in FIG. 6 according to the embodiment of the present disclosure.

FIG. 9 is a cross-sectional view showing a state that grout has been filled in FIG. 6 according to the embodiment of the present disclosure. According to the embodiment of the present disclosure, the grouting unit is installed inside the jacket leg 1, and a lower end thereof passes through and is connected to a lower end of the jacket leg 1, forming a grout pipe 50 through which the grout 3 is introduced into a space between the jacket leg 1 and the seabed-pile 10 in a state that the jacket leg 1 has been fixed inside the seabed-pile 10.

Further, a grout seal 51 may be provided between a lower end surface of the jacket leg 1 and the seabed-pile 10. Also, a vertical gripper ring 23 may be provided between the upper support plate and the vertical gripper.

A tilt sensor measures a tilt of the jacket leg 1, and a control portion is configured to control operations of the vertical gripper 30, the upper horizontal gripper 41 and the lower horizontal gripper 42, based on a value measured from the tilt sensor. That is, the control portion controls the vertical gripper 30 based on a value measured from the tilt sensor to adjust a horizontality degree of the jacket leg 1, and controls operations of the upper horizontal gripper 41 and the lower horizontal gripper 42 based on a weight of the jacket leg 1 while maintaining horizontality.

Particularly, the vertical gripper 30 is designed to level off the whole jacket structure. For this, the vertical gripper 30 should be designed to support the structure with a hydraulic cylinder force larger than the weight of the jacket.

Following construction, the lower horizontal gripper 42 has been buried, not allowing being recycled. On the other hand, the stabbing member where at least one of the vertical gripper and the upper horizontal gripper 41, or the both thereof have been installed is detached after construction, allowing being recycled.

The four vertical grippers 30 per the jacket leg 1 are positioned on an upper part of the pile 10 and maintains horizontality of the jacket structure composed of the three to four jacket legs 1. Capacity for each hydraulic cylinder to be installed to the jacket leg 1 is 196 t (on three-leg jacket structure basis).

The four hydraulic cylinders per the leg 1 are installed, whereby allowing adjusting horizontality of the structure with a hydraulic cylinder output of 2,325 tons for 1,200 tons of the jacket structure composed of the three legs 1.

A vertical gripper ring 23 exists between the vertical gripper 30 and the upper part of the seabed-pile 10 so as not to directly apply stress concentration to the pile 10. This vertical gripper ring 23 is joined to the seabed pile 10 by tack welding prior to construction and then detached during a leveling-off process.

In the upper horizontal gripper 41, more cylinders are required than horizontal lower cylinders, in a vertical direction. The reason for this is that a position of the upper horizontal gripper 41 is a point where a wave force acting on horizontality and a wave-induced moment are focused, and that the jacket structure is fixed to the pile 10 and the total weight thereof taking account of friction coefficient in water should be supported. Accordingly, relatively more numbers of the cylinders are needed.

The maximum output capacity of each cylinder of the upper horizontal gripper 41 is designed to be 316 tons, as considering that expected maximum weight of the jacket structure is 1,200 tons, and a horizontal wave force and a moment are 1989 kN and 624,000 Nmm respectively (ten (10) hydraulic cylinders). Wherein the horizontal wave force and the moment are obtained by applying following conditions: friction coefficient of steels in contact with each other in water is 0.2; time period of wave is 1 second using Morrison equation; wave height is 1.5 m, a depth is 30 m; and a diameter of the jacket leg 1 is 2.6 m. This numerical value signifies maintaining the own weight of the jacket structure (6000 tons) taking account of friction coefficient, and the space between the pile 10 and the jacket leg 1, which might be generated by the wave force and the moment, within 1 mm.

A horizontal lower part intends to prevent being affected by moments remaining in the upper part of the pile 10 and to support the jacket structure taking account of friction coefficient, as same as a horizontal upper part. The specification of the horizontal lower part and the output of the hydraulic cylinder are same as the lower cylinder, and there is a difference only in the number thereof. However, when increasing the number of the hydraulic cylinders of the upper horizontal gripper 41 according to marine conditions and environment, the lower horizontal gripper 42 may be excluded from the design. When, in the jacket structure, there is not any issue in a vertical tilt and a degree of fixation with the pile 10, the grout 3 is then introduced. Further, the grout seal 51 is installed in the lower end of the jacket leg 1 for effective sealability and filling capability.

The invention claimed is:

1. A stabbing system for installing an offshore jacket structure, wherein the stabbing system is used for fixing a jacket leg of the offshore jacket structure inserted into a seabed-pile, the seabed-pile being pre-inserted into a seabed, the stabbing system comprising:

a stabbing member that is installed on an external surface of the jacket leg and supported by an upper end surface of the seabed-pile when the jacket leg has been inserted into the seabed-pile;

a plurality of vertical grippers that are installed in the stabbing member and operated toward an upper end surface of the seabed-pile to adjust an angle between a longitudinal axis of the jacket leg and a horizontal plane defined by a seabed surface;

a plurality of horizontal grippers that are installed in an outer periphery of the stabbing member and operated toward an external surface of the seabed-pile to fix the jacket leg to the seabed-pile; and a grouting unit that introduces grout into a space between the jacket leg and the seabed-pile, wherein:

the stabbing member includes a horizontal support plate that is formed in a form of ring plate on the external surface of the jacket leg and seated on the upper end surface of the seabed-pile;

the stabbing member includes a vertical support plate that has a tubular form, is bent in an outer periphery of the horizontal support plate and is connected to a lower part thereof;

each of the vertical grippers are spaced apart from each other at a certain interval in a circumference direction on an upper surface of the horizontal support plate, and a vertical gripper piston is operated toward the upper end surface of the seabed-pile by a vertical hydraulic cylinder, adjusting the angle between the longitudinal axis of the jacket leg and the horizontal plane defined by the seabed surface of the seabed-pile;

each of the horizontal grippers includes an upper horizontal gripper, spaced apart from each other at a certain interval in a circumference direction on an external surface of the vertical support plate so that an orientation of each upper horizontal gripper is perpendicular to an orientation of each vertical gripper, and a first piston is operated toward the external surface of the seabed-pile by a first hydraulic cylinder, fixing the jacket leg to the seabed-pile;

each of the horizontal grippers includes a lower horizontal gripper, spaced apart from each other at a certain interval in a circumference direction on an inner end surface of the jacket leg and a second piston is operated toward an inner surface of the seabed-pile by a second hydraulic cylinder, fixing the jacket leg to the sea-bed pile, wherein an orientation of each lower horizontal gripper is perpendicular to the orientation of each vertical gripper;

the grouting unit is installed inside the jacket leg, and a lower end thereof passes through and is connected to a lower end of the jacket leg, forming a grout pipe through which the grout is introduced into the space between the jacket leg and the seabed-pile after the jacket leg has been fixed inside the seabed-pile;

the grouting unit further includes a grout seal provided between a lower end surface of the jacket leg and the seabed-pile; and a detachable vertical gripper ring is provided between the horizontal support plate and the each of the vertical grippers to prevent a direct application of stress concentration to the seabed-pile.

2. An installation method using the stabbing system according to claim 1 to install the offshore jacket structure of claim 1, the installation method comprising the steps of:

inserting the seabed pile into the seabed;

putting the jacket leg of the jacket structure inside the seabed pile;

seating, on an upper end of the seabed pile, the stabbing member of the stabbing system according to claim 1, and adjusting the angle between the longitudinal axis of the jacket leg and the horizontal plane defined by the seabed surface of the seabed-pile;

fixing the jacket leg to the seabed-pile by operating each of the upper horizontal grippers of the stabbing system and each of the lower horizontal grippers of the stabbing system; and introducing the grout into the space between the jacket leg and the seabed-pile through the grouting unit after the jacket leg has been fixed inside the seabed-pile.

3. The installation method of claim 2, wherein:

the stabbing system measures a tilt of the jacket leg and controls operations of each of the vertical grippers, each of the upper horizontal grippers and each of the lower horizontal grippers, based on a tilt value representing the measured tilt; and the stabbing system controls each of the vertical grippers based on the tilt value to adjust the angle between the longitudinal axis of the jacket leg and the horizontal plane defined by the seabed surface of the seabed-pile, and controls operations of each of the upper horizontal grippers and each of the lower horizontal grippers based on a weight of the jacket leg while maintaining horizontality.

* * * * *